United States Patent [19]

Ernst et al.

[11] 4,139,242
[45] Feb. 13, 1979

[54] LINEAR MOTION BALL BEARING

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 839,978

[22] Filed: Oct. 6, 1977

[30] Foreign Application Priority Data

Oct. 23, 1976 [DE] Fed. Rep. of Germany ... 7633262[U]

[51] Int. Cl.$^2$ .............................................. F16C 29/06
[52] U.S. Cl. ...................................... 308/6 C; 64/23.7
[58] Field of Search ............... 308/6 C, 3.5, 6 R, 6 B, 308/201; 64/23.7, 23

[56] References Cited

U.S. PATENT DOCUMENTS

| | | | |
|---|---|---|---|
| 3,070,405 | 12/1962 | Hülck et al. | 308/6 C |
| 3,330,606 | 7/1967 | Suda | 308/6 C |
| 3,844,629 | 10/1974 | Haines | 308/6 C |

Primary Examiner—Trygve M. Blix
Assistant Examiner—Douglas C. Butler
Attorney, Agent, or Firm—Daniel M. Rosen

[57] ABSTRACT

A ball bearing with a cylindrical ball cage intermediate a shaft and outer shell, and alternately spaced longitudinal load portions and ball-return paths in the bore of the shell, has additional longitudinal recesses in the bore for receiving with play a mating longitudinal rib on the cage, which permits restricted lateral and circumferential movement of the balls relative to the shell during longitudinal movement of these balls.

9 Claims, 4 Drawing Figures

LINEAR MOTION BALL BEARING

BACKGROUND OF THE INVENTION

This invention relates to a ball bearing for longitudinal movements of a cylindrical shaft with ball races, which in themselves are closed and distributed about the circumference of the bearing. The ball bearing has an outer shell or sleeve with longitudinal load sections, which are distributed about the circumference of the bore of the outer shell, and with depression or return race sections, which are arranged between the load sections. In addition, the ball bearing has a bearing cage, which guides the balls and which is mounted in the bore of the outer shell in such a manner that it can rotate.

The state of the art includes a ball bearing in which the balls of each ball race, that are under load, run on different surface lines of the longitudinal sections, the surface lines being inclined at an angle. Because of unrestricted rotation of the bearing cage in operation, the balls under load roll laterally from their longitudinal sections into the connecting depression or return grooves in the bore of the outer shell, where the load is removed from them. In a similar manner, the balls of each ball race, which are not under load, run, through rotation of the bearing cage, to the respective longitudinal section in the bore of the outer shell, where they are placed under load. It is a serious disadvantage of this ball box, that the load is removed intermittently from the balls as they enter laterally into the depression section, and that the load is applied intermittently as they enter onto the longitudinal section; the consequence is that the balls and races are stressed excessively and damaged, resulting in a correspondingly short lifetime for the ball bearing. In addition, as a result of the intermittent or jerky application and removal of load on the balls, this known ball bearing operates noisily.

It is an object of the present invention to create an improved ball bearing, which has a long lifetime and functions noiselessly and smoothly without intermittent strains. It is a further object that manufacture of this ball bearing should be economical and relatively simple.

SUMMARY OF THE INVENTION

In accordance with the invention, the above-described objects are accomplished by provision of means for limiting the rotational movement of the bearing cage relative to the outer shell. In this manner, the balls under load run in the domain of the respective longitudinal sections without leaving these longitudinal sections to run into the laterally connecting depression sections. Similarly, the balls of each ball race which are not under load, are kept in the domain of the depression sections. As the load is applied or relieved, damaging impacts of the balls, by accumulating on a longitudinal section or running into a depression section, are accordingly excluded.

According to a particular embodiment of the invention, the means for limiting the rotational movement are formed by at least one radial projection at the bearing cage, which engages with play in circumferential direction, one corresponding recess in the bore of the outer shell.

According to a different embodiment of the invention, the means for limiting the rotational movement are formed by at least one radial projection fashioned as a single piece in the bore of the outer shell, that engages with play in circumferential direction, a corresponding recess in the bearing cage. In other words, rather than forming the projection to extend outwardly from the bearing cage into a recess defined in the outer shell, the structure is reversed so that the projection is formed in the outer shell to extend radially inwardly into a recess formed in the cage. This projection can be formed by ribs, running in axial direction, or by a hump-shaped elevation, i.e., a convex protuberance which, for example, is formed outwardly from the cage into a complimentary recess formed in the sleeve bore.

According to a further feature of the invention, an end ring lies closely against the face of the outer shell and overlaps the casing surface of the end of the bearing cage; this ring can be fastened by welding or other means at each of the two ends of the bearing. Finally, the bearing cage and/or the end rings are manufactured from a wear-resistant material such as plastic.

DETAILED DESCRIPTION OF THE PREFERRED EMBODIMENT

Figure 1:
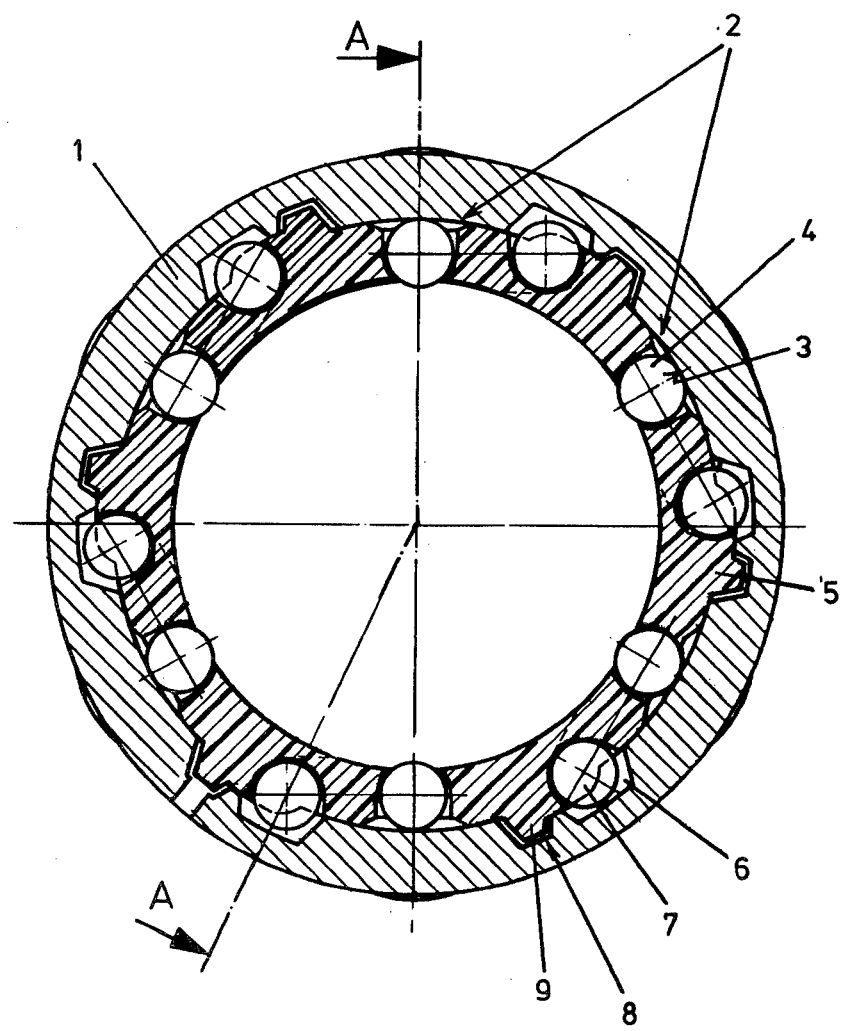
FIG. 1 shows a cross section through one embodiment of the new ball bearing.
Figure 2:
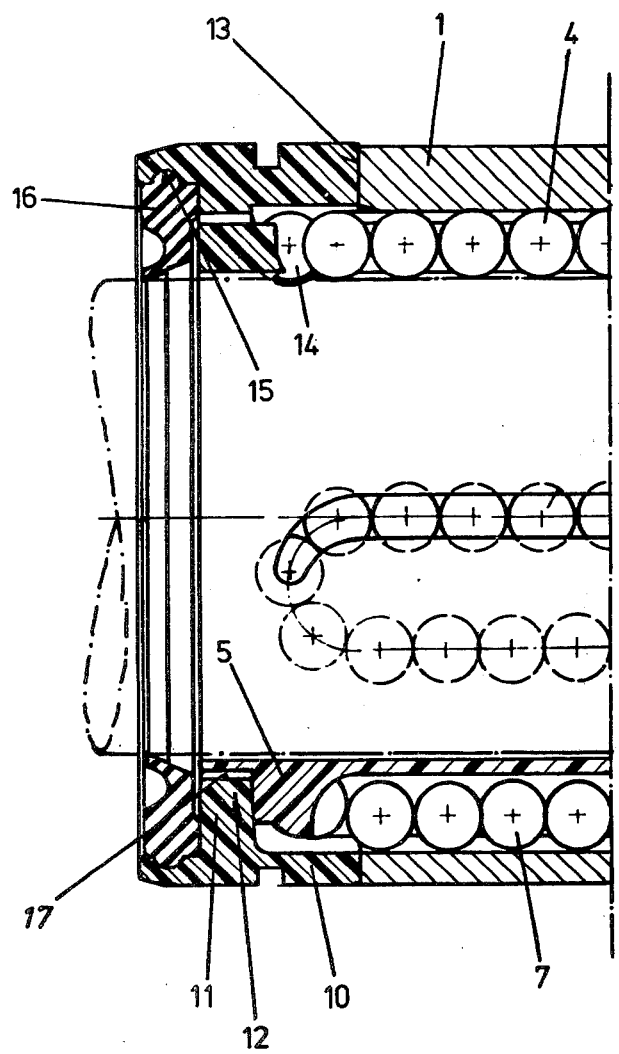
FIG. 2 a partial longitudinal section along line A—A in FIG. 1.

In FIGS. 1 and 2, reference number 1 denotes the outer shell of the new ball bearing for supporting a cylindrical shaft (drawn with alternating dots and dashes), which may be constructed of ball-bearing steel. Distributed in its bore about the circumference, this outer shell 1 has cylindrical longitudinal sections 2, which include the races 3 for the balls 4 under load of the ball bearing. The bearing cage 5 is arranged in such a manner that it can rotate on the cylindrical longitudinal sections 2 of the bore. A depression or return race section 6, for taking up the balls 7 of the ball bearing which are not under load, as well as a longitudinal directed recess 8 are included in the circumference of the bore between each two longitudinal sections 2. A single-piece, axially running rib 9 on the bearing cage engages each recess 8 in the bore of the outer shell 1, with play in the circumferential direction.

As can be seen in FIG. 2, an end ring 10 is fastened at each of the two ends of the bearing cage 5. In so doing, single-piece cams 11 of the end rings 10 protrude into the corresponding indentations 12 on the face side of the bearing cage 5 and are welded to this bearing cage 5. Bearing cage 5 and end rings 10 are advantageously manufactured of an abrasion-resistant material, such as plastic. The cams 11 are economically connected with the bearing cage 5 by ultrasonic welding, whereby the end rings 10 are pressed axially so as to lie closely against the face surface 13 of the outer shell 1. At the same time, the material of the cam 11, which is deformed on welding and displaced, can flow into the cavity 17, that has been provided radially between the bearing cage 5 and the end rings 10 and/or into the gap between the seal 16 and the cam 11. In other respects, each end ring 10 overlaps the casing surface of the end of the bearing cage 5, so that the balls 14 which are rerouted in the bearing cage 5 from the zone in which they are under load to the zone in which they are not under load, are covered radially from outside and so prevented from falling out of the bearing cage 5. An elastic seal 16 is snapped into the bore 15 of each end ring 10.

The new ball bearing has the advantage, that the bearing cage 5, together with both end rings 10 is arranged in such a manner that it can rotate relative to the outer shell 1 within limits, as determined by the play in the circumferential direction between the rib 9 in the recess 8. By such means the balls 4 under load are not displaced laterally beyond the longitudinal sections 2 where the effective contact occurs, and an especially impact-free and noiseless operation is ensured. At the same time, the balls 4 under load can move laterally with the bearing cage 5, which is held so that it can rotate within limits, thus preventing the balls 4 under load from jamming in the bearing cage, as might otherwise happen when assembling the bearing (e.g. through spacing errors), when mounting the bearing in the bore of the housing or in operation from non-uniform loads of the ball bearings 4, the bearing cage 5 and/or the outer shell 1. In addition, the new ball bearing has a relatively long lifetime, since the balls 4 under load can shift laterally with the bearing cage 5, so that these balls 4 constantly come into contact with the new surface lines of the longitudinal sections 2.

Figure 3:
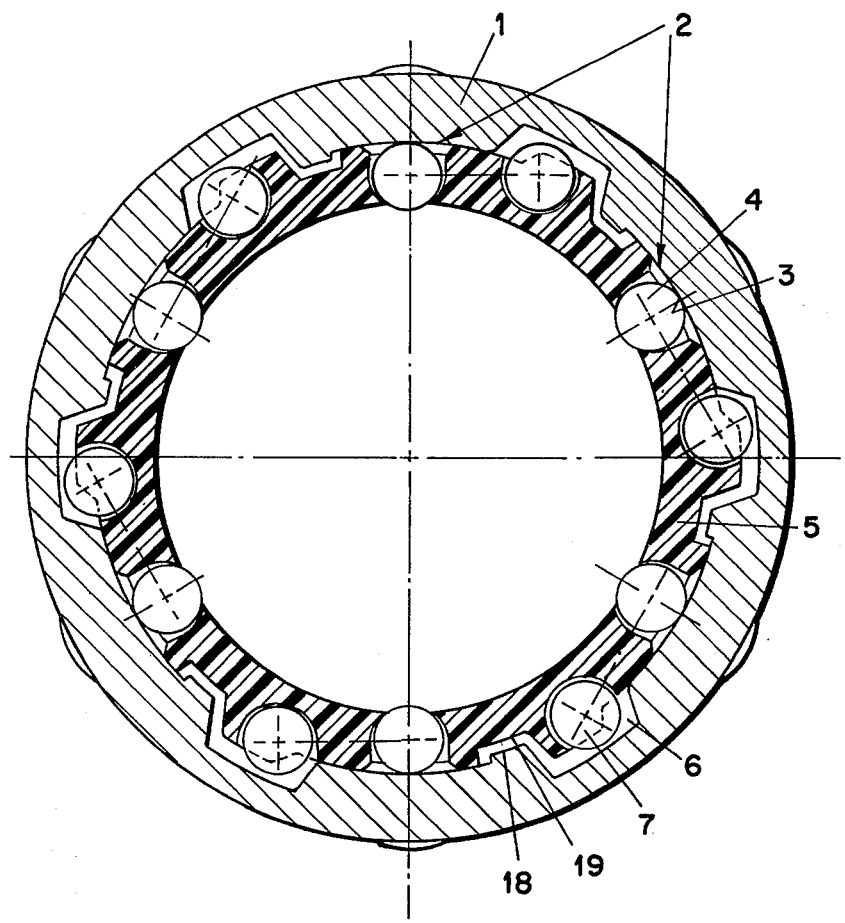
FIG. 3 is a cross-sectional view of another embodiment of the present invention.

Referring to FIG. 3, another embodiment of the present invention is shown wherein rather than forming the ribs 9 to extend outwardly from the bearing cage into the recess 8 defined in the outer shell, the structure is reversed so that axially extending ribs 18 are formed to extend inwardly from the outer shell into recesses 19 formed in the cage. As in the case of the embodiment shown in FIG. 1, there is a degree of play in the circumferential direction of the ribs 18 interfitted within recesses 19.

Figure 4:
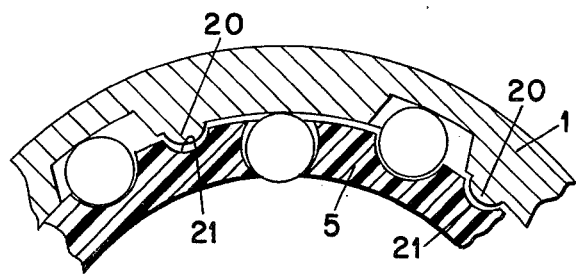
FIG. 4 is a partial cross-sectional view of still another embodiment of the present invention.

In other respects, the invention is not limited to the example described, but may be altered extensively within the scope of the innovative concept. For example, the outer shell may be slit and mounted with elastic pretension over the balls under load. In order to reduce cross section or to save material, axially running ribs can also be replaced by individual, hump-shaped elevations in the bore of the outer shell which engage a corresponding recess in the bearing cage with play in the circumferential direction. Thus, referring to FIG. 4, convex protuberances 20 are provided on the sleeve or outer shell 1 which extend inwardly and are received within similarly shaped recesses 21 formed in cage 5. Again, there is some play in the circumferential direction of the protuberances 20 within recesses 21 to afford a restricted rotation of the cage and balls relative to the bore surface in the circumferential direction.

What is claimed is:

1. In a linear motion ball bearing assembly including a cylindrical sleeve with a bore having terminal ends and an adjacent ball-retaining cage for use with a shaft within said cage, the bore and cage having adjacent surfaces defining a plurality of continuous ball circulation paths, each comprising a longitudinal load surface along said bore surface and adjacent longitudinal return groove in said bore surface, said bearing further comprising means for permitting restricted rotation of said cage and balls relative to said bore surface in circumferential direction comprising means projecting from one of said adjacent cage and bore surfaces into a recess in the other of said adjacent surfaces, with circumferential play provided between said projecting means and recess means for permitting said cage and balls to move slightly laterally relative to said sleeve.

2. A ball bearing assembly according to claim 1 wherein said means for permitting restricted rotational movement of the cage and balls relative to the bore surface of the sleeve comprises at least one radial projection from said cage into a depression in said sleeve.

3. A ball bearing according to claim 2 wherein said radial projection is an axially extending rib.

4. A ball bearing according to claim 2 wherein said means for permitting restricted relative rotational movement of the cage and balls comprises a hump-shaped elevation.

5. A ball bearing according to claim 2 wherein said means for permitting restricted rotational movement comprises a plurality of longitudinal ribs extending from said cage into corresponding longitudinal recesses in the bore, corresponding in number to the number of return grooves in said bore.

6. A ball bearing according to claim 1 wherein said means for permitting restricted relative rotational movement of the cage and balls comprises at least one radial projection from the sleeve into a depression in the cage.

7. A ball bearing according to claim 1 further comprising an end ring secured at each end of said cage for engaging the terminal ends of the sleeve and closing and sealing the ends of said ball-circulation paths.

8. A linear motion ball bearing assembly comprising:
an outer cylindrical sleeve defining a bore having two ends;
an inner ball-retaining cage adapted for cooperation with a shaft to be located within said cage;
a plurality of continuous ball circulation paths, each of said paths being defined by a plurality of axially extending depressions formed in said bore defining between them a plurality of longitudinal bore surface sections, said depressions at least partially defining in cooperation with said cage the return portion of the ball circulation paths, and a plurality of axially extending slots formed in said cage, each of said slots being in opposed relationship to one of said longitudinal bore surface sections, defining the load bearing portion of the ball circulation paths;
at least one radially outwardly projecting rib formed on and extending axially over at least a portion of the length of said cage;
at least one recess formed in and extending axially over at least a portion of the length of said sleeve bore, said recess having a width which is slightly greater than the width of said rib, said rib mating and interfitting within said recess;
whereby said cage and said sleeve are slightly movable with respect to each other in the circumferential direction by virtue of said recess having a width slightly greater than the width of the rib interfitted therewithin.

9. A linear motion ball bearing assembly comprising:
an outer cylindrical sleeve defining a bore having two ends;
an inner ball-retaining cage adapted for cooperation with a shaft to be located within said cage;
a plurality of continuous ball circulation paths, each of said paths being defined by a plurality of axially extending depressions formed in said bore defining between them a plurality of longitudinal bore surface sections, said depressions at least partially defining in cooperation with said cage the return portion of the ball circulation paths, and a plurality of axially extending slots formed in said cage, each of said slots being in opposed relationship to one of said longitudinal bore surface sections, defining the load bearing portion of the ball circulation paths;

at least one radially inwardly projecting rib formed on and extending axially over at least a portion of the length of said sleeve bore;

at least one recess formed in and extending axially over at least a portion of the length of said cage, said recess having a width which is slightly greater than the width of said rib, said rib mating and interfitting within said recess;

whereby said cage and said sleeve are slightly movable with respect to each other in the circumferential direction by virtue of said recess having a width slightly greater than the width of the rib interfitted therewithin.

* * * * *